(12) United States Patent
Ding et al.

(10) Patent No.: US 12,586,155 B2
(45) Date of Patent: Mar. 24, 2026

(54) ADAPTIVE MODEL FOR SUPER-RESOLUTION

(71) Applicant: Microsoft Technology Licensing, LLC, Redmond, WA (US)

(72) Inventors: Tianyu Ding, Kirkland, WA (US); Jinxin Zhou, Columbus, OH (US); Tianyi Chen, Redmond, WA (US); Ilya Dmitriyevich Zharkov, Redmond, WA (US); Luming Liang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

(21) Appl. No.: 18/513,081

(22) Filed: Nov. 17, 2023

(65) Prior Publication Data

US 2025/0166126 A1     May 22, 2025

(51) Int. Cl.
G06T 3/4053 (2024.01)
G06T 3/4046 (2024.01)
G06T 5/70 (2024.01)

(52) U.S. Cl.
CPC .......... G06T 3/4053 (2013.01); G06T 3/4046 (2013.01); G06T 5/70 (2024.01);
(Continued)

(58) Field of Classification Search
CPC ....... G06T 3/4053; G06T 3/4046; G06T 5/70; G06T 2207/20081; G06T 2207/20084;
(Continued)

(56) References Cited

U.S. PATENT DOCUMENTS

| | | | |
|---|---|---|---|
| 12,051,174 B2 * | 7/2024 | Xie | G06V 10/82 |
| 2022/0148130 A1 * | 5/2022 | Tang | G06N 3/09 |

(Continued)

FOREIGN PATENT DOCUMENTS

| | | | | |
|---|---|---|---|---|
| WO | WO-2024159082 A2 * | 8/2024 | | G06N 20/20 |

OTHER PUBLICATIONS

Casser, et al., "Depth Prediction without the Sensors: Leveraging Structure for Unsupervised Learning from Monocular Videos", In Proceedings of Thirty-Third AAAI Conference on Artificial Intelligence, Jan. 27, 2019, pp. 8001-8008.
(Continued)

*Primary Examiner* — Jose L Couso
(74) *Attorney, Agent, or Firm* — Shook Hardy & Bacon L.L.P.

(57) ABSTRACT

The technology described herein provides an improved training framework for a diffusion model used for a super resolution (SR) task. In particular, the technology provides diffusion rectification to correct a training-sampling discrepancy inherent in current training methods. The technology also provides estimation-adaptation. The diffusion rectification portion of the technology uses an estimated HR image, rather than a ground truth HR image as the seed to the forward process. This improves model performance issues caused by a training-sampling discrepancy. The training-sampling discrepancy occurs because the training and sampling processes do not use the same data. The estimation adaption strategy injects ground truth to the plurality of noisy images to reduce the training-estimation error in the images. In an aspect, a different amount of ground truth is injected into training images based on the training image's location in the Markov chain.

20 Claims, 7 Drawing Sheets

(52) U.S. Cl.
CPC .............. *G06T 2207/20081* (2013.01); *G06T 2207/20084* (2013.01)

(58) Field of Classification Search
CPC . G06T 5/60; G06T 9/002; G06T 2207/20076; G06T 7/50; G06T 9/00; G06T 2207/20028; G06T 2207/10024; G06T 10/24; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06V 20/46; G06F 18/214; G06F 18/22; G06F 18/241; G06F 18/24; G06F 18/2411; G06F 18/2415; G06F 30/27; Y10S 128/925; H04N 21/234363; H04N 7/0117
See application file for complete search history.

(56) References Cited

U.S. PATENT DOCUMENTS

| | | | | |
|---|---|---|---|---|
| 2022/0398836 | A1* | 12/2022 | Zheng | G06V 10/85 |
| 2023/0153959 | A1* | 5/2023 | Saharia | G06T 5/70 |
| | | | | 382/100 |
| 2024/0161327 | A1* | 5/2024 | Chen | G06T 11/60 |
| 2024/0171788 | A1* | 5/2024 | Kreis | G06T 3/4053 |
| 2025/0124544 | A1* | 4/2025 | Park | G06T 5/50 |
| 2025/0142145 | A1* | 5/2025 | Kreis | H04N 21/234363 |

OTHER PUBLICATIONS

Chen, et al., "Learning Continuous Image Representation With Local Implicit Image Function", In Proceedings of IEEE/CVF Conference on Computer Vision and Pattern Recognition, Jun. 19, 2021, pp. 8628-8638.

Gao, et al., "Implicit Diffusion Models for Continuous Super-Resolution", In Proceedings of IEEE/CVF Conference on Computer Vision and Pattern Recognition, Jun. 18, 2023, pp. 10021-10030.

Ji, et al., "DDP: Diffusion Model for Dense Visual Prediction", In Repository of arXiv:2303.17559v2, May 13, 2023, 19 Pages.

Saharia, et al., "Image Super-Resolution via Iterative Refinement", In Journal of IEEE Transactions on Pattern Analysis and Machine Intelligence, vol. 45, Issue 4, Apr. 2023, pp. 4713-4726.

International Search Report and Written Opinion received for PCT Application No. PCT/US2024/050614, Jan. 31, 2025, 21 pages.

Saxena, et al., "The Surprising Effectiveness of Diffusion Models for Optical Flow and Monocular Depth Estimation", arXiv:2306.01923v1, Jun. 2, 2023, 26 pages.

* cited by examiner

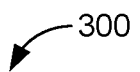
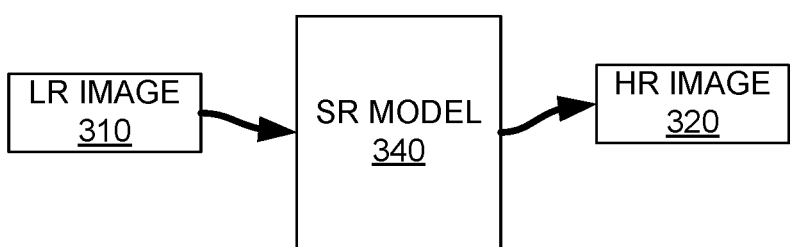
FIG. 3

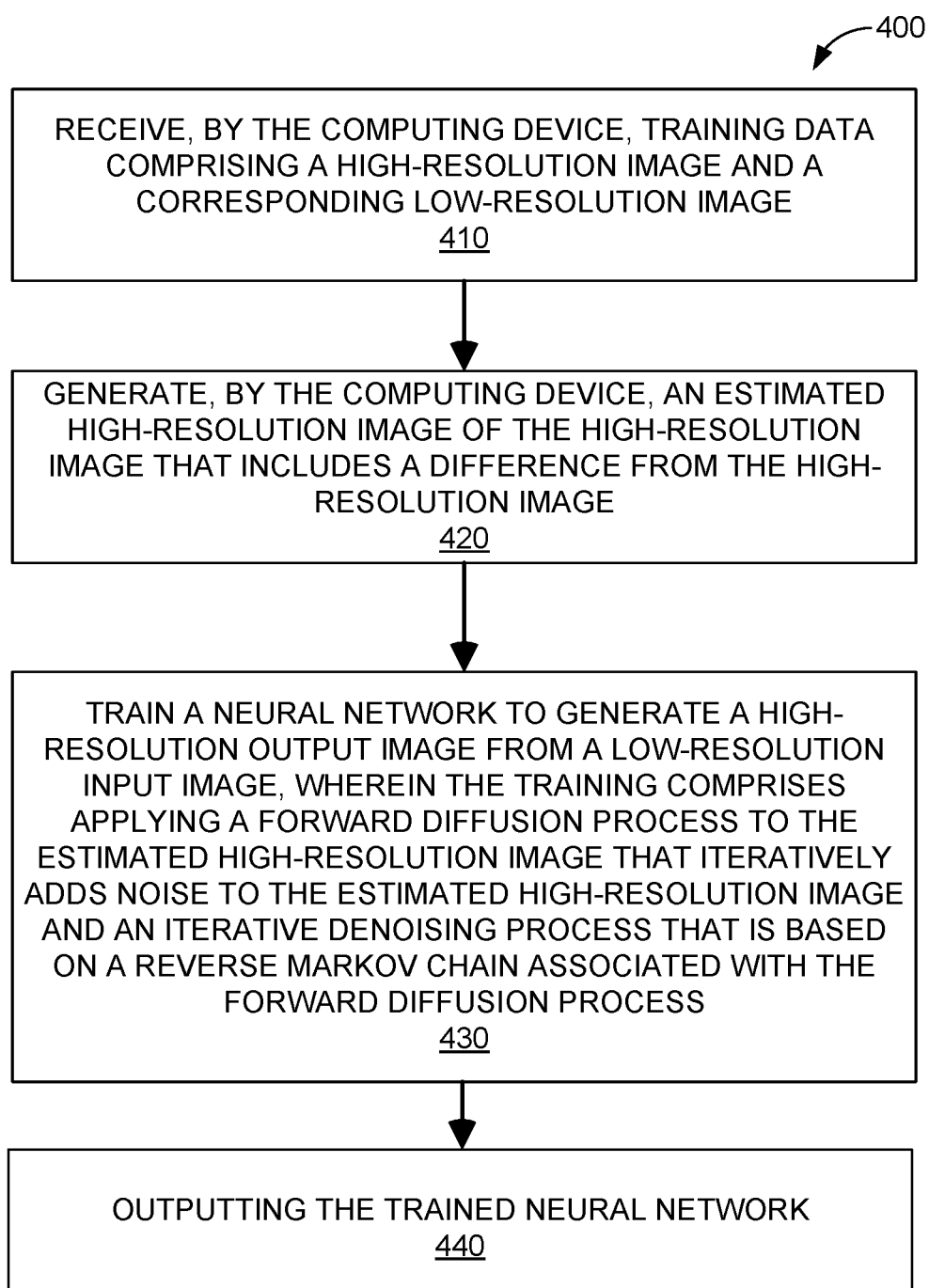

400

RECEIVE, BY THE COMPUTING DEVICE, TRAINING DATA
COMPRISING A HIGH-RESOLUTION IMAGE AND A
CORRESPONDING LOW-RESOLUTION IMAGE
410

GENERATE, BY THE COMPUTING DEVICE, AN ESTIMATED
HIGH-RESOLUTION IMAGE OF THE HIGH-RESOLUTION
IMAGE THAT INCLUDES A DIFFERENCE FROM THE HIGH-
RESOLUTION IMAGE
420

TRAIN A NEURAL NETWORK TO GENERATE A HIGH-
RESOLUTION OUTPUT IMAGE FROM A LOW-RESOLUTION
INPUT IMAGE, WHEREIN THE TRAINING COMPRISES
APPLYING A FORWARD DIFFUSION PROCESS TO THE
ESTIMATED HIGH-RESOLUTION IMAGE THAT ITERATIVELY
ADDS NOISE TO THE ESTIMATED HIGH-RESOLUTION IMAGE
AND AN ITERATIVE DENOISING PROCESS THAT IS BASED
ON A REVERSE MARKOV CHAIN ASSOCIATED WITH THE
FORWARD DIFFUSION PROCESS
430

OUTPUTTING THE TRAINED NEURAL NETWORK
440

FIG. 4

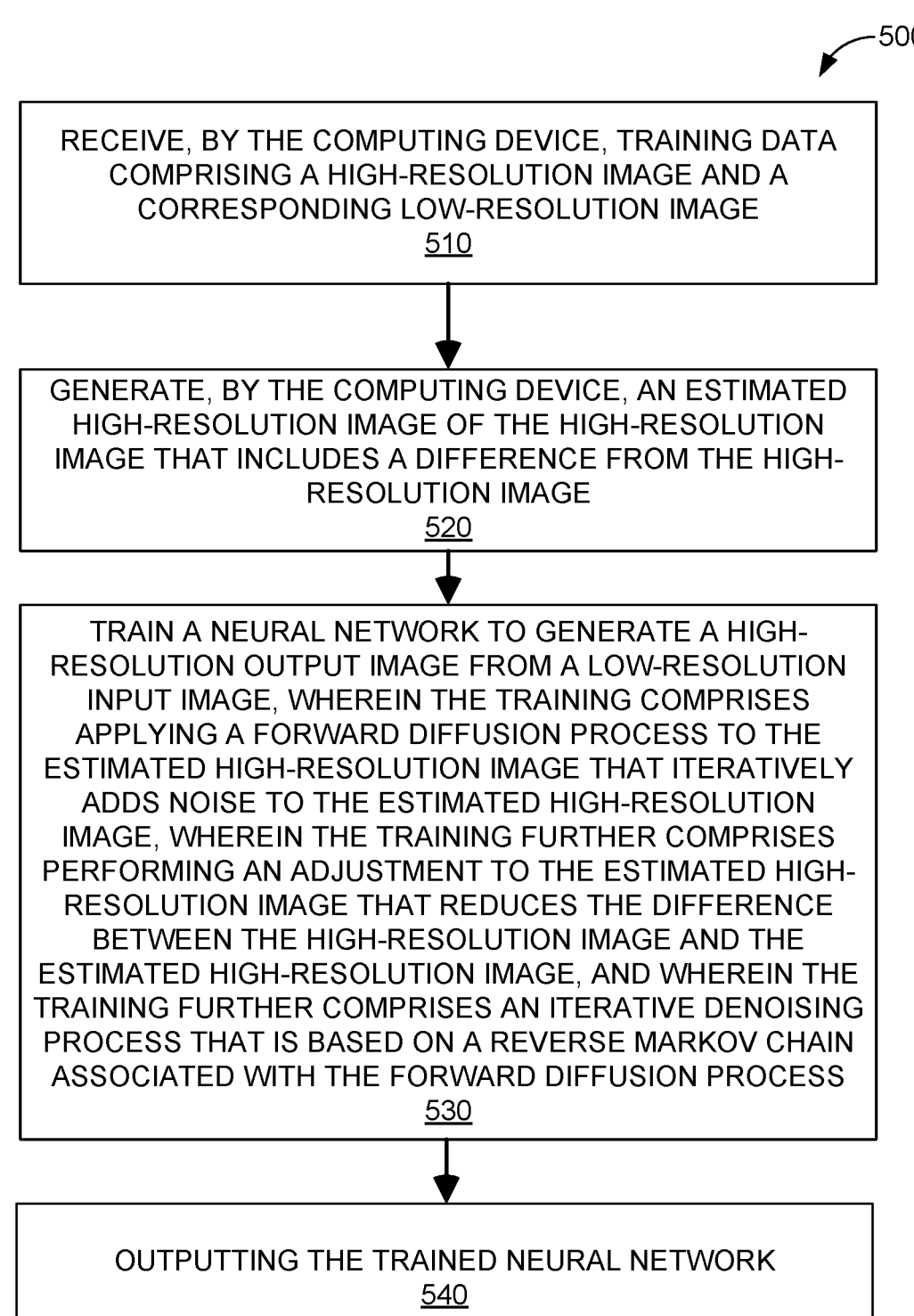

~500

RECEIVE, BY THE COMPUTING DEVICE, TRAINING DATA COMPRISING A HIGH-RESOLUTION IMAGE AND A CORRESPONDING LOW-RESOLUTION IMAGE
510

GENERATE, BY THE COMPUTING DEVICE, AN ESTIMATED HIGH-RESOLUTION IMAGE OF THE HIGH-RESOLUTION IMAGE THAT INCLUDES A DIFFERENCE FROM THE HIGH-RESOLUTION IMAGE
520

TRAIN A NEURAL NETWORK TO GENERATE A HIGH-RESOLUTION OUTPUT IMAGE FROM A LOW-RESOLUTION INPUT IMAGE, WHEREIN THE TRAINING COMPRISES APPLYING A FORWARD DIFFUSION PROCESS TO THE ESTIMATED HIGH-RESOLUTION IMAGE THAT ITERATIVELY ADDS NOISE TO THE ESTIMATED HIGH-RESOLUTION IMAGE, WHEREIN THE TRAINING FURTHER COMPRISES PERFORMING AN ADJUSTMENT TO THE ESTIMATED HIGH-RESOLUTION IMAGE THAT REDUCES THE DIFFERENCE BETWEEN THE HIGH-RESOLUTION IMAGE AND THE ESTIMATED HIGH-RESOLUTION IMAGE, AND WHEREIN THE TRAINING FURTHER COMPRISES AN ITERATIVE DENOISING PROCESS THAT IS BASED ON A REVERSE MARKOV CHAIN ASSOCIATED WITH THE FORWARD DIFFUSION PROCESS
530

OUTPUTTING THE TRAINED NEURAL NETWORK
540

FIG. 5

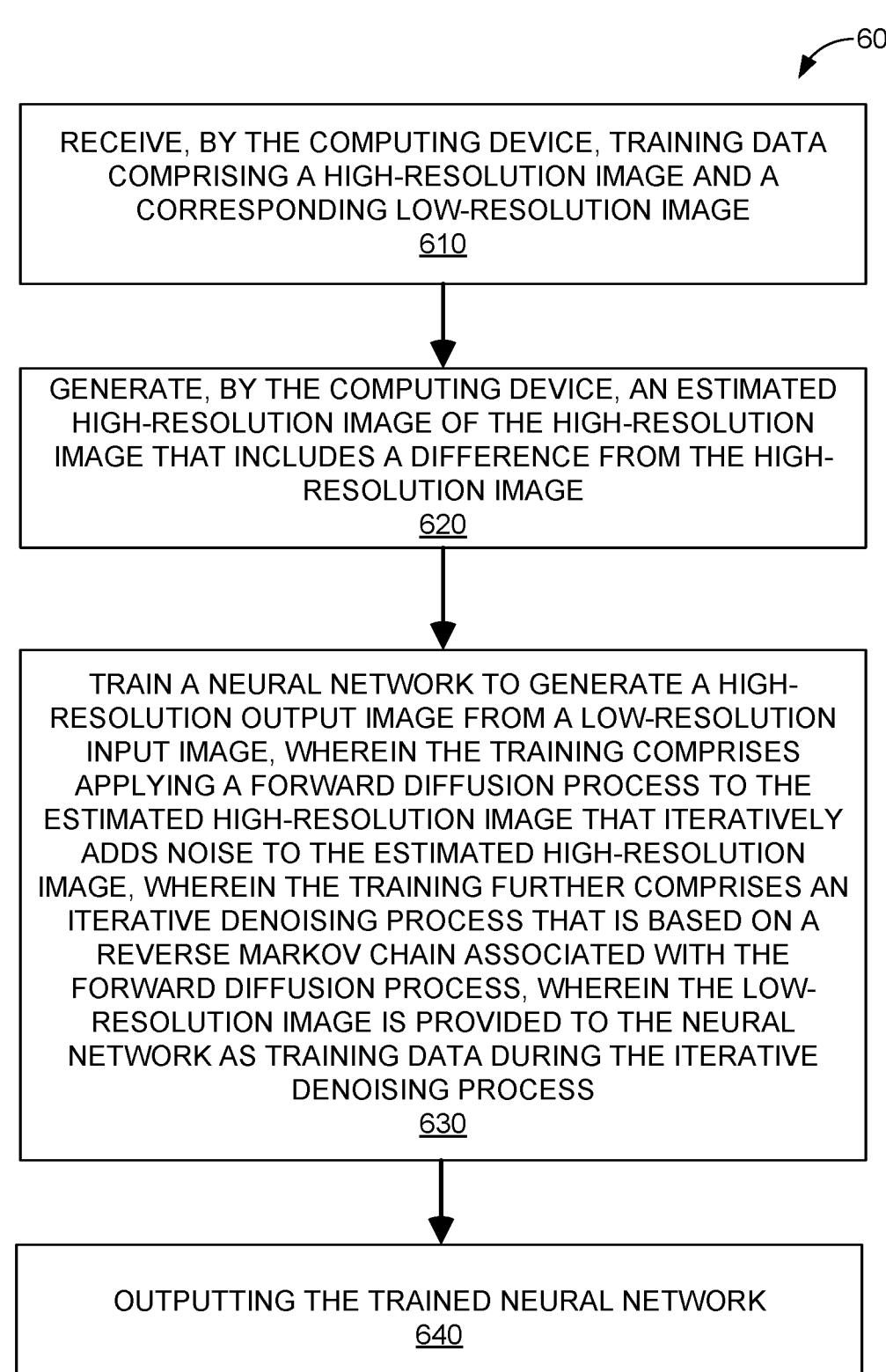

600

RECEIVE, BY THE COMPUTING DEVICE, TRAINING DATA
COMPRISING A HIGH-RESOLUTION IMAGE AND A
CORRESPONDING LOW-RESOLUTION IMAGE
610

GENERATE, BY THE COMPUTING DEVICE, AN ESTIMATED
HIGH-RESOLUTION IMAGE OF THE HIGH-RESOLUTION
IMAGE THAT INCLUDES A DIFFERENCE FROM THE HIGH-
RESOLUTION IMAGE
620

TRAIN A NEURAL NETWORK TO GENERATE A HIGH-
RESOLUTION OUTPUT IMAGE FROM A LOW-RESOLUTION
INPUT IMAGE, WHEREIN THE TRAINING COMPRISES
APPLYING A FORWARD DIFFUSION PROCESS TO THE
ESTIMATED HIGH-RESOLUTION IMAGE THAT ITERATIVELY
ADDS NOISE TO THE ESTIMATED HIGH-RESOLUTION
IMAGE, WHEREIN THE TRAINING FURTHER COMPRISES AN
ITERATIVE DENOISING PROCESS THAT IS BASED ON A
REVERSE MARKOV CHAIN ASSOCIATED WITH THE
FORWARD DIFFUSION PROCESS, WHEREIN THE LOW-
RESOLUTION IMAGE IS PROVIDED TO THE NEURAL
NETWORK AS TRAINING DATA DURING THE ITERATIVE
DENOISING PROCESS
630

OUTPUTTING THE TRAINED NEURAL NETWORK
640

MEMORY

712

PROCESSOR(S)

714

PRESENTATION
COMPONENT(S)

716

RADIO(S)

724

I/O PORT(S)

718

I/O COMPONENTS

720

POWER SUPPLY

722

710

ADAPTIVE MODEL FOR SUPER-RESOLUTION

CROSS-REFERENCE TO RELATED APPLICATIONS

None.

BACKGROUND

Super-resolution (SR) entails creating high-resolution (HR) images from given low-resolution (LR) counterparts. SR plays an important role in various applications ranging from video surveillance to medical diagnosis and photography. However, SR poses several challenging problems due to the unknown degradation in the real-world and the inherent fact that different HR images can share the same down sample LR image. Over the past decade, deep learning algorithms have significantly enhanced the state-of-the-art in SR, with progress primarily divided into two categories: regression-based and generation-based methods.

Regression-based methods strive to minimize the pixel wise differences between super-resolution (SR) predictions and their HR references. Nonetheless, measuring discrepancies at the pixel level is generally inadequate for capturing the true perceptual differences between images. The generated images are usually deficient in sharp, high frequency content, resulting in a noticeably blurred appearance. To enhance the details in predicted images, generation-based methods leverage various advanced generative models, including autoregressive models, variational auto encoders (VAEs), normalizing flows (NFs), and generative adversarial networks (GANs). Although adept at producing higher quality SR images, these methods face different challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein provides an improved training framework for a diffusion model used for a super resolution (SR) task. In particular, the technology provides diffusion rectification to correct a training-sampling discrepancy inherent in current training methods. The technology also provides estimation-adaptation, which adds additional supervision to the training process. In combination, the diffusion rectification and estimation-adaption model, may be referred to by the acronym DREAM herein.

Diffusion models work by corrupting the training data by progressively adding noise (e.g., Gaussian noise), slowly wiping out details in the training data until it becomes pure noise, and then training a neural network to reverse this corruption process. Running this reversed corruption process synthesizes data from pure noise by gradually denoising it until a sample is produced. The technology described herein may be used to train a diffusion model to generate a high resolution (HR) image given a low resolution (LR) image.

The diffusion rectification portion of the DREAM technology uses an estimated HR image, rather than a ground truth HR image as the seed to the forward process. This improves model performance issues caused by a training-sampling discrepancy that is rooted in the use of the ground truth HR image as the seed to the forward noise addition process.

The training-sampling discrepancy occurs because the training and sampling processes do not use the same data. The sampling process involves estimation error because the ground truth image is not available during sampling, while the current training process (non-DREAM) does account for estimation error because of the ground truth HR image is used. The diffusion rectification process teaches the SR model to account for estimation error that will be present during sampling by adding estimation error to the training process. This modification empowers denoiser networks to account for the training-sampling discrepancy that results from different constructions of intermediate signals from ground-truth data during training versus from model-generated estimates during sampling. Thus, diffusion rectification trains the diffusion model starting with an estimated version of the HR image, rather than the ground truth HR image.

The DREAM technology may use an estimation adaptation strategy that smoothly shifts focus between standard diffusion and diffusion rectification based on a trend of estimation error, which includes more estimation error at the noisy side of the Markov chain. The estimation adaption strategy injects ground truth to the plurality of noisy images to reduce the training-estimation error in the images. In an aspect, a different amount of ground truth is injected into training images based on the training image's location in the Markov chain. In an aspect, the estimation adaption strategy reduces the training-estimation error present in training images closest to the seed by injecting comparatively more ground truth. Conversely, the estimation adaption strategy may inject little or no ground truth into the nosiest training images at the end of the diffusion process (and start of the reverse process).

BRIEF DESCRIPTION OF THE DRAWINGS

The technology described herein is illustrated by way of example and not limitation in the accompanying figures in which like reference numerals indicate similar elements and in which:

FIG. 3 is a block diagram of an example operating environment for using an SR model, in accordance with an aspect of the technology described herein;

FIG. 4 is a flow diagram showing a method of training an SR model, in accordance with an aspect of the technology described herein;

FIG. 5 is a flow diagram showing a method of training an SR model, in accordance with an aspect of the technology described herein;

FIG. 6 is a flow diagram showing a method of training an SR model, in accordance with an aspect of the technology described herein.

DETAILED DESCRIPTION

Figure 1:
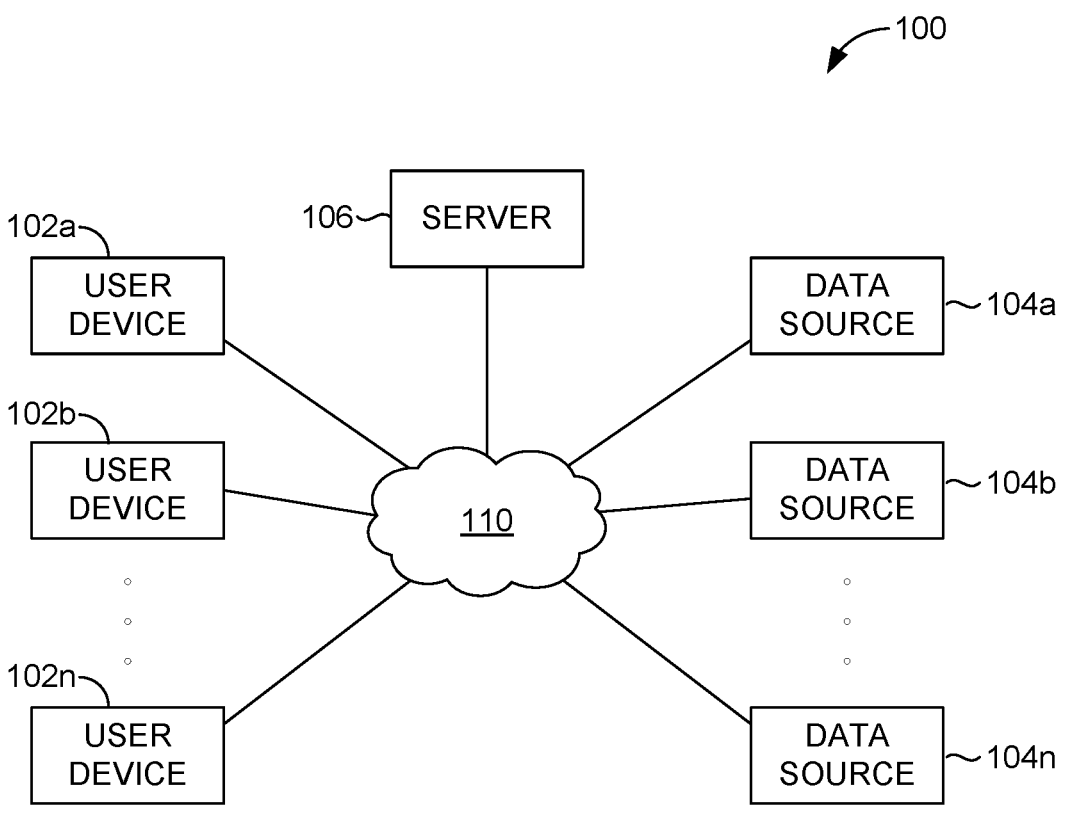
FIG. 1 is a diagram of a computing system suitable for implementations of the technology described herein.

The various technologies described herein are set forth with sufficient specificity to meet statutory requirements.

However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides an improved training framework for a diffusion model used for a super resolution (SR) task. In particular, the technology provides diffusion rectification to correct a training-sampling discrepancy inherent in current training methods. The technology also provides estimation-adaptation, which adds additional supervision to the training process. In combination, the diffusion rectification and estimation-adaption model, may be referred to by the acronym DREAM herein.

Diffusion models work by corrupting the training data by progressively adding noise (e.g., Gaussian noise), slowly wiping out details in the training data until it becomes pure noise, and then training a neural network to reverse this corruption process. Running this reversed corruption process synthesizes data from pure noise by gradually denoising it until a sample is produced. The technology described herein may be used to train a diffusion model to generate a high resolution (HR) image given a low resolution (LR) image.

The diffusion rectification portion of the DREAM technology may use an estimated HR image, rather than a ground truth HR image as the seed to the forward process. This improves model performance issues caused by a training-sampling discrepancy that is rooted in the use of the ground truth HR image as the seed to the forward noise addition process. As used herein, the sampling process is the SR model making a prediction given an input. The sampling process may include multiple iterations, such as 100 iterations, 1000 iteration, or more. In each iteration or step, the SR model infers a higher resolution image than present in the previous iteration. This may be done by predicting a noise mask and removing the noise in the noise mask from the image input to the SR model at the iteration.

The training-sampling discrepancy occurs because the training and sampling processes do not use the same data. The sampling process involves estimation error because the ground truth image is not available during sampling, while the current training process (non-DREAM) does account for estimation error because of the ground truth HR image is used. The diffusion rectification process teaches the SR model to account for estimation error that will be present during sampling by adding estimation error to the training process.

The presence of estimation error induces a discrepancy between the training and sampling phases. Training is learned by the SR model incrementally denoising noisy images derived from ground truth data. In non-DREAM training, there is no estimation involved in generating the noisy images because noise is added directly to a ground truth HR image. In contrast, sampling involves denoising from noisy images generated by estimates made by the SR model in prior steps. The multi-step nature of sampling across the Markov chain means that such discrepancies accumulate with each step resulting in an HR image that includes estimation error. The estimation error curtails the full potential of current diffusion probabilistic models (DPMs).

To align the training process with the sampling process and help the SR model account for estimation error, the diffusion rectification strategy described herein extends traditional diffusion training by integrating an estimation error into the training data.

In one aspect, the estimation error is introduced by performing a single additional forward pass without training, which allows the SR model to use its own predictions. A pre-trained SR model may be the starting point for the DREAM training, which allows the SR model to make an initial prediction. As used herein, $t_0$ is a starting point, $t_1$ represents data after the first forward step and $t_n$ after the last forward step. In order to create the estimated HR, the HR image at $t_0$ may be provided the SR model training system, which adds a noise mask at $t_1$ to the HR image at $t_0$ to create a noisy image at $t_1$. The pre-trained SR model then generates an estimated noise mask at $t_1$. Under traditional methods, the SR model would then be trained to reduce the difference between the noise mask at $t_1$ and the estimated noise mask at $t_1$. Under the DREAM training, no training occurs during this first pass. Instead, the estimated HR image is generated by removing the noise from the noisy image at $t_1$ according to the estimated noise mask at $t_1$. The difference between the noise mask at $t_1$ and the estimated noise mask at $t_1$ will be reflected in the estimated HR image. This difference represents the SR model's current estimation error.

This modification empowers denoiser networks to account for the training-sampling discrepancy that results from different constructions of intermediate signals from ground-truth data during training versus from model-generated estimates during sampling. Thus, diffusion rectification trains the diffusion model starting with an estimated version of the HR image, rather than the ground truth HR image.

The estimated HR image may be generated using a pre-trained version of the machine-learning model. Using the estimated HR image during training, rather than the ground truth HR image causes the model to generate more accurate HR images. More accurate may be defined as the difference between a HR image generated from a test LR image and a corresponding test HR image. Using an estimated HR image during training, rather than the ground truth HR image more closely approximates the sampling environment because the sampling environment does not have access to the ground truth HR image either. The difference between the ground truth HR image and the estimated HR image may be described herein as the training-estimation error.

The DREAM training process includes a diffusion or forward process where noise is added to the seed image (e.g., starting image). As used herein, the seed image is the image provided to the diffusion process as the starting point for diffusion and also represents the target image for training during the reverse process. This means a goal of the training is for the SR model to produce the seed image at the end of the reverse process. In the DREAM framework, the diffusion process results in a plurality of training images where each image includes the training-estimation error and a different amount of noise. It should be noted that the training images may not be all generated at once by traversing the Markov chain. Instead, they may be directly generated at each iteration from the seed image by adding a noise mask to the image. Each iteration in the diffusion process may generate a noise mask that includes comparatively more noise until the last mask is pure noise. Nevertheless, conceptually, the diffusion process results in a plurality of training images that are provided to the SR model during training. Each training image includes the training-estimation error and a different amount of noise.

While diffusion rectification adds a training-estimation error to the diffusion images to account for the estimation error in the sampling process, directly applying it to the SR model training may result in a trade-off between improved distortion and reduced perceptual quality. To harness the strengths of both standard diffusion and diffusion rectification, the DREAM technology may use an estimation adaptation strategy that smoothly shifts focus between standard diffusion and diffusion rectification based on a trend of estimation error, which includes more estimation error at the noisy side of the Markov chain. The estimation adaption strategy injects ground truth to the plurality of noisy images to reduce the training-estimation error in the images. In an aspect, a different amount of ground truth is injected into training images based on the training image's location in the Markov chain. In an aspect, the estimation adaption strategy reduces the training-estimation error present in training images closest to the seed by injecting comparatively more ground truth. Conversely, the estimation adaption strategy may inject little or no ground truth into the nosiest training images at the end of the diffusion process (and start of the reverse process).

The DREAM technology may work with existing diffusion model architectures, such as the super resolution 3 (SR3) architecture, which is based on a U-Net convolutional network.

The technologies herein are described using key terms wherein definitions are provided. However, the definitions of key terms are not intended to limit the scope of the technologies described herein.

As used herein, a Markov chain is a mathematical system that experiences transitions from one state to another according to certain probabilistic rules. The defining characteristic of a Markov chain is that no matter how the process arrived at its present state, the possible future states are fixed.

As used herein, a neural network

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102b through 102n; a number of data sources, such as data sources 104a and 104b through 104n; server 106; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, server 106 is provided via multiple devices arranged in a distributed environment that collectively provides the functionality described herein. Additionally, other components not shown may also be included within the distributed environment.

User devices 102b through 102n can be client user devices on the client-side of operating environment 100, while server 106 can be on the server-side of operating environment 100. Server 106 can comprise server-side software designed to work in conjunction with client-side software on user devices 102b through 102n so as to implement any combination of the features and functionalities discussed in the present disclosure. In one aspect, the server hosts a SR model and SR model training system. In aspects, the user devices 102b through 102n provide a user interface to the SR model 240 and SR model training 260 system. This division of operating environment 100 is provided to illustrate one example of a suitable environment, and there is no requirement for each implementation that any combination of server 106 and user devices and 102b through 102n remain as separate entities.

In some embodiments, user devices 102b through 102n comprise any type of computing device capable of use by a user. For example, in one embodiment, user devices 102b through 102n are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or system 200 described in connection to FIG. 2. The data sources may include training data for the SR model 240 and/or input and output from a trained model. For example, the data sources 104a and 104b through 104n Certain data sources 104a and 104b through 104n are discrete from user devices 102b through 102n and server 106 or are incorporated and/or integrated into at least one of those components. In one embodiment, one or more of data sources 104a and 104b through 104n comprise one or more sensors, which are integrated into or associated with one or more of the user device(s) 102b through 102n or server 106. For example, the data sources could include a web camera used to interact with a virtual environment.

Figure 2:
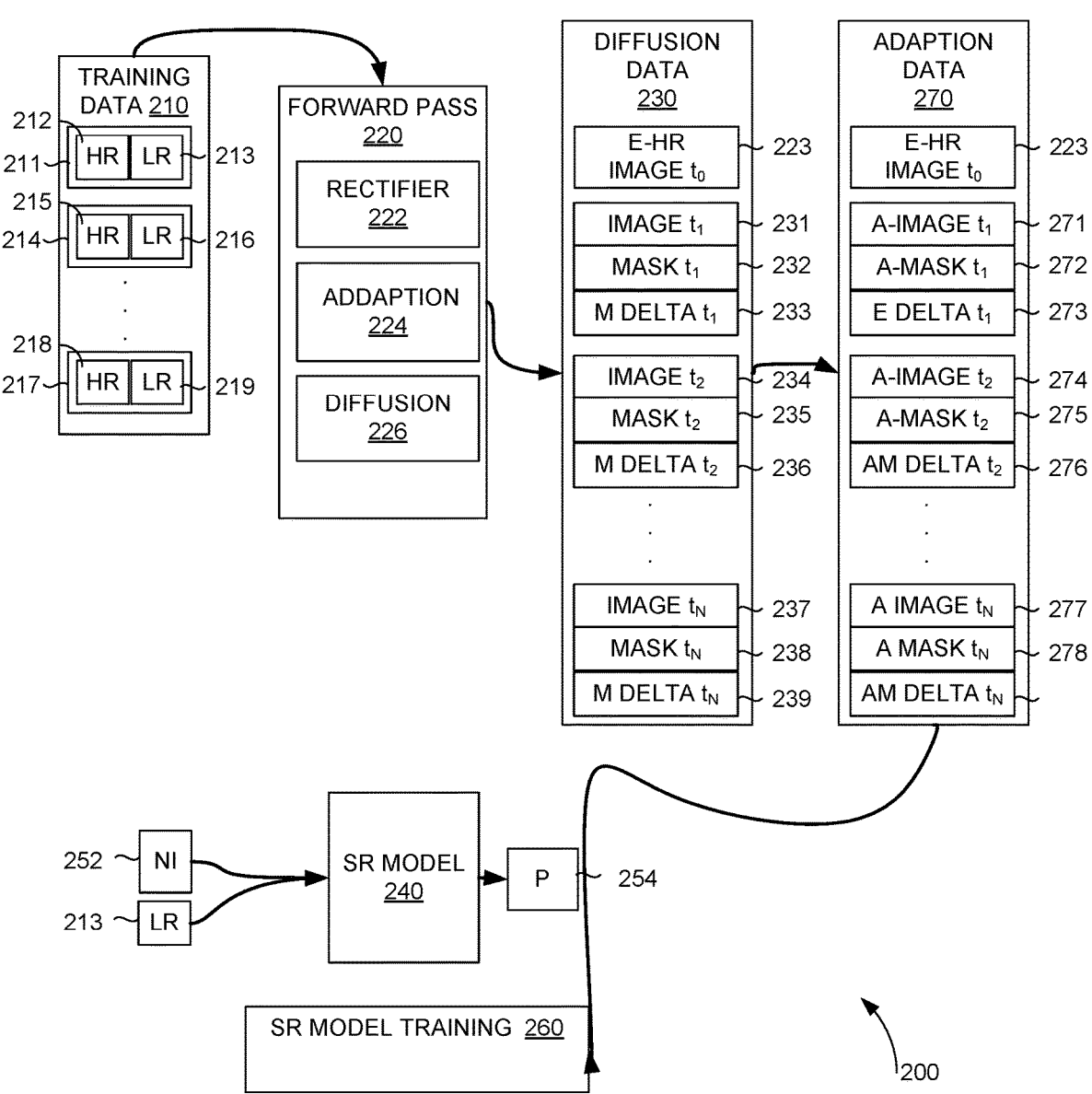
FIG. 2 is a block diagram of an example operating environment for training an SR model, in accordance with an aspect of the technology described herein.

Operating environment 100 can be utilized to implement one or more of the components of system 200, as described in FIG. 2. Operating environment 100 can also be utilized for implementing aspects of methods 400, 500, and 600 in FIGS. 4, 5, and 6, respectively.

Referring now to FIG. 2 with FIG. 1, a block diagram is provided showing aspects of an example computing system architecture suitable for implementing some embodiments of the disclosure and designated generally as system 200. FIG. 2 illustrates the training of SR model 240, using training data 210, forward pass component 220, and diffusion data 230.

The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of system 200 are associated with training and using a SR model 240. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components and/or computer systems.

The system 200 includes training data 210, forward pass component 220, diffusion data 230, the SR model 240, and the SR Model training 260 component. Together, these components, along with others not shown, may train the SR model 240 to generate an HR image given a LR image as input.

The training data 210 may include image pairs, such as image pair 211, image pair 214, and image pair 217. Each image pair may include a HR image and a LR image. For example, image pair 211 includes HR image 212 and LR image 213, image pair 214 includes HR image 215 and LR image 215, and image pair 217 includes HR image 218 and LR image 219. In some aspects, training data comprising a plurality of pairs of images, wherein each pair comprises a LR image and at least one corresponding HR image that serves as a target version of the image. Each LR image may be associated with a plurality of HR image versions. The SR model 240 may be trained based on the training data 210 to predict an enhanced version of an input image.

The training of the SR model 240 may include the forward pass component 220 applying a forward Gaussian diffusion process that adds Gaussian noise to the at least one corresponding target version of each of the plurality of pairs of images to form diffusion data. The training may enable iterative denoising of the input image. The iterative denoising is based on a reverse Markov chain associated with the forward Gaussian diffusion process.

The SR model may be a neural network following a U-Net architecture.

The forward pass component 220 includes a rectifier component 222, adaption component 224, and a diffusion component 226. The rectifier component 222 generates an estimated HR image $t_0$ 223 that will act as a seed for the diffusion component 226, which iteratively adds noise to the estimated HR image $t_0$ 223. The rectifier component 222 may take an HR image, such as HR image 212, and generate an estimated HR image $t_0$ 223.

In one aspect, the estimation error is introduced by performing a single additional forward pass without training, which allows the SR model to use its own predictions. A pre-trained SR model may be the starting point for the DREAM training, which allows the SR model to make an initial prediction. As used herein, to is a starting point, $t_1$ represents data after the first forward step and $t_n$ after the last forward step. In order to create the estimated HR, the HR image $t_0$ may be provided the SR model training system, which adds a noise mask $t_1$ to the HR image $t_0$ to create a noisy image $t_1$. The pre-trained SR model then generates an estimated noise mask $t_1$. Under traditional methods, the SR model would then be trained to reduce the difference between the noise mask $t_1$ and the estimated noise mask $t_1$. Under the DREAM training, no training occurs during this first pass. Instead, the estimated HR image is generated by removing the noise from the noisy image $t_1$ according to the estimated noise mask $t_1$. The difference between the noise mask $t_1$ and the estimated noise mask $t_1$ will be reflected in the estimated HR image. This difference represents the SR model's current estimation error.

In one aspect, the estimation error is introduced by performing a single additional forward pass without training, which allows the SR model 240 to use its own predictions. A pre-trained SR model may be the starting point for the DREAM training, which allows the SR model 240 to make an initial prediction. As used herein, to is a starting point, $t_1$ represents data after the first forward step and $t_n$ after the last forward step. In order to create the estimated HR $$\hat{y}_0^{train},$$

the HR image $y_0$ may be provided the SR model training system, which adds a noise mask to the HR image $y_0$ to create a noisy image $y_1$. The pre-trained SR model then generates an estimated noise mask Under traditional methods, the SR model 240 would then be trained to reduce the difference between the noise mask at $t_1$ and the estimated noise mask at $t_1$. Under the DREAM training, no training occurs during this first pass. Instead, the estimated HR image is generated by removing the noise from the noisy image $y_1$ according to the estimated noise mask at $t_1$. The difference between the noise mask at $t_1$ and the estimated noise mask at $t_1$ will be reflected in the estimated HR image $$\hat{y}_0^{train}.$$

This difference represents the SR model's current estimation error.

Specifically, during training, upon acquiring $$y_t^{train},$$

the rectifier component 222 refrains from directly minimizing $\mathcal{L}(\theta)$. Instead, the rectifier component 222 constructs a prediction of the HR image as $$\tilde{y}_0^{train}$$

according to Eq. (1), formulated as:

$$\tilde{y}_0^{train} = \frac{1}{\sqrt{\overline{\alpha}_t}}\left(y_t^{train} - \sqrt{1-\overline{\alpha}_t}\,\epsilon_\theta(x_0, y_t^{train}, t)\right) \quad (1)$$

$$= \frac{1}{\sqrt{\overline{\alpha}_t}}\left(\sqrt{\overline{\alpha}_t}\,y_0 + \sqrt{1-\overline{\alpha}_t}\,\epsilon_t - \sqrt{1-\overline{\alpha}_t}\,\epsilon_\theta(x_0, y_t^{train}, t)\right)$$

$$= y_0 + \sqrt{(1-\overline{\alpha}_t/\overline{\alpha}_t}\,\Delta\epsilon_{t,\theta}$$

where $$\Delta\epsilon_t\theta = \epsilon_t - \epsilon_\theta(x_0, y_t^{train}, t).$$

Utilizing this self-estimated HR image $$\tilde{y}_0^{train},$$

the rectifier component 222 generates the noisy image $$\tilde{y}_t^{train}$$

to serve as input to the SR model $\epsilon_\theta$ once more:

$$\tilde{y}_t^{train} = \sqrt{\overline{\alpha}_t}\,\tilde{y}_0^{train}\sqrt{1-\overline{\alpha}_t}\,\epsilon_t' \quad (2)$$

$$= \sqrt{\overline{\alpha}_t}\,y_0 + \sqrt{(1-\overline{\alpha}_t)}\,(\epsilon_t' + \Delta\epsilon_{t,\theta}),$$

where $$\epsilon_t' \sim \mathcal{N}(0, I).$$

Then, the training objective for this diffusion rectification model (DRM) (e.g., SR model 240) can be expressed as:

$$\mathcal{L}^{DRM}(\theta) = \mathbb{E}_{(x_0, y_0), \epsilon_t, \epsilon_t', t}\left\|(\epsilon_t' + \Delta\epsilon_{t,\theta}) - \epsilon_\theta(x_0, \tilde{y}_t^{train}, t)\right\|_1 \quad (3)$$

Essentially, Eq. (3) suggests that this DRM approach strives not only to eliminate the sampled noise $$\epsilon_t'$$

but also to address the error term $\Delta\epsilon_{t,\theta}$ arising from the discrepancy between the imperfect estimation $$\tilde{y}_0^{train}$$

and the ground-truth $y_0$, as seen in Eq. (1); hence the term "rectification". Notably, leveraging the model's own prediction during training as in Eq. (2) mirrors the sampling process of Denoising Diffusion Implicit Models with a particular choice of $\sigma_t$, thereby imposing enhanced supervision.

$$\tilde{y}_0^{train}$$

may correspond to estimated HR image $t_0$ 223.

The diffusion component 226 adds noise to $$\tilde{y}_0^{train}$$

to generate training data for the SR model 240 to denoise during training. The diffusion process, also referred to as the forward process, takes a sample $y_0$ from the data distribution $p(y_0|x_0)$ and simulates the non-equilibrium thermodynamic diffusion process. The diffusion component 226 may receive a sample $$\tilde{y}_0^{train}$$

from the rectifier component 222. It gradually adds Gaussian noise to $$\tilde{y}_0^{train}$$

via a fixed Markov chain of length T:

$$q(\tilde{y}_t^{train}|\tilde{y}_{t-1}^{train}) = \mathcal{N}(\tilde{y}_t^{train}; \sqrt{1-\beta_t}\,\tilde{y}_{0t-1}^{train}, \beta_t I), \quad (4)$$

$$q(\tilde{y}_{1:T}^{train}|\tilde{y}_0^{train}) = \prod_{t=1}^{T} q(\tilde{y}_t^{train}|\tilde{y}_{t-1}^{train}) \quad (5)$$

where $$\{\beta_t \in (0, 1)\}_{t=1}^{T}$$

is the variance scheduler. As the step t increases, the image $$\bar{y}_0^{train}$$

gradually loses its distinguishable features. Ultimately, as $t \to \infty$, $y_t$ the image converges to an isotropic Gaussian distribution. Moreover, the distribution can be derived for sampling at arbitrary step t from $$\bar{y}_0^{train}:$$

$$q(\bar{y}_t^{train} | \bar{y}_0^{train}) = \mathcal{N}(\bar{y}_t^{train}; \sqrt{\bar{\alpha}_t} \, \bar{y}_0^{train}, (1 - \bar{\alpha}_t)I). \tag{6}$$

where $$\bar{\alpha}_t = \prod_{i=1}^t \alpha_i$$

and $\alpha_t = 1 - \beta_t$. $y_t$ may then be parameterized as $$\bar{y}_0^{train} = \sqrt{\bar{\alpha}_t} \, \bar{y}_0^{train} + \sqrt{1 - \bar{\alpha}_t} \, \epsilon_t.$$

Sampling at an individual step, such as $t_1$, allows diffusion data for step $t_1$ to be generated directly without traversing the entire Markov chain. The diffusion data for step $t_1$ can include image $t_1$ 231, noise mask $t_1$ 232, and a noise delta $t_1$ 233. The noise mask $t_1$ 232 represents the noise added to the HR image $t_0$ 223 at step $t_1$. In other words, image $t_1$ 231 may be generated by adding the noise mask $t_1$ 232 to the estimated high-resolution image 223. The noise mask may be a matrix with the same dimensions as estimated high-resolution image $t_0$ 223. The noise delta $t_1$ 233 is the difference between the noise added between consecutive iterations, in this case between to and $t_1$. In the first iteration, the noise delta $t_1$ 233 will equal the noise mask $t_1$ 232. In other iterations, the noise delta $t_1$ 233 may be calculated from the noise mask used to generate noisy images at consecutive steps (e.g. time t=4 and t=5). The training data generated by the diffusion component 226, may be described as diffusion data 230. The diffusion data may be further include image $t_2$ 234, noise mask $t_2$ 235, a noise delta $t_2$ 236, image $t_N$ 237, noise mask $t_N$ 238, and a noise delta $t_N$ 239.

The adaption component 224 may adjust the amount of rectification applied at each iteration. While the rectifier component 222 incorporates additional rectification supervision to account for the estimation error in the sampling process, its naive application to the SR task may be improved by combining it with estimation adaption. Despite achieving a state-of-the-art peak signal-to-noise ratio (less distortion), the images produced by training with only rectification adjustment may be smoother and include less details than desired in some implementations, reflecting a high Frechet Inception Distance (FID) score (lower perception). FID is a metric that calculates the distance between feature vectors calculated for real and generated images. The HR images produced with less detail could be traced back to the rectification adjustment's static self-alignment mechanism, which may guide the generated images to regress towards the mean.

To address the issue an estimation adaptation strategy is provided by the adaption component 224. The estimation adaptation strategy aims to harness both the superior quality of standard diffusion and the reduced distortion offered by diffusion rectification. Specifically, rather than naively using $$\bar{y}_0^{train},$$

the adaption component 224 adaptively injects ground-truth information $y_0$ by blending it with $$\bar{y}_0^{train}$$

as follows:

$$\hat{y}_0 = \lambda_t \bar{y}_0^{train} + (1 - \lambda_t) y_0, \tag{7}$$

where $\lambda_t \in (0, 1)$ is an increasing function such that $\hat{y}_0$ emphasizes more on $y_0$ at smaller t, aligning with the SR model's tendency to achieve more accurate predictions. As t decreases, $\hat{y}_0$ closely approximates the ground-truth, making it more beneficial to resemble the standard diffusion, yielding images with realistic details. Conversely, as t increases and the prediction leans towards random noise, it is advantageous to focus more on the estimation itself, effectively aligning the training and sampling processes through the rectification.

Following the adaptive estimation $\hat{y}_0$ in Eq. (7), we construct the new noisy image $\hat{y}_t$ similarly as before:

$$\begin{aligned}\hat{y}_t &= \sqrt{\bar{\alpha}_t} \, \hat{y}_0 + \sqrt{1 - \bar{\alpha}_t} \, \epsilon_t' \\ &= \sqrt{\bar{\alpha}_t} \, y_0 + \sqrt{1 - \bar{\alpha}_t} \, (\epsilon_t' + \lambda_t \Delta \epsilon_{t,\theta}).\end{aligned} \tag{8}$$

Using equation 8, the adaption component 224 can generate the adaption data 270. The adaption data 270 includes adapted image $t_1$ 271, adapted noise mask $t_1$ 272, adapted noise delta $t_1$ 273, adapted image $t_2$ 274, adapted noise mask $t_2$ 275, adapted noise delta $t_2$ 276, adapted image $t_N$ 277, adapted noise mask $t_N$ 278, and an adapted noise delta $t_N$ 279. The adaption data may be used to train the SR model 240.

Finally, the training objective for the full Diffusion Rectification and Estimation-Adaptive Model (DREAM) can be expressed as:

$$\mathcal{L}^{DREAM}(\theta) = \mathbb{E}_{(x_0, y_0), \epsilon_t, \epsilon_t', t} \| (\epsilon_t' + \lambda_t \Delta \epsilon_{t,\theta}) - \epsilon_\theta(x_0, \hat{y}_t, t) \|_1 \tag{9}$$

Choice of $\lambda_t$. Comparing Eq. (9) with Eq. (3), the key difference lies in the introduction of $\lambda_t$ for adaptively modulating the intensity of the rectification term $\Delta \epsilon_{t,\theta}$. Note that $\lambda_t \in (0, 1)$ only needs to be increasing to leverage the benefits of both standard diffusion and rectification. In practice,

US 12,586,155 B2

13

$$\lambda_t = \left(\sqrt{1 - \overline{\alpha}_t}\right)^p$$

may be set where p adds an extra layer of flexibility: at p=0, $\lambda_t$ remains at 1, reverting the method to full rectification with consistent static rectification; as p→∞, $\lambda_t$→0, transitioning the rectification towards the standard diffusion model. The images produced by DREAM with p=1 achieve a superior balance between perception and distortion, significantly outperforming the standard SR3 model across both metrics.

---

Algorithm 1 Conditional DREAM Training

---

1: repeat
2:  $(x_0, y_0\sim)p(x_0, y_0)$, $t \sim \mathbb{U}(1, T)$, $\epsilon_t \sim \mathcal{N}(0, I)$ 3:  Compute $y_t = \sqrt{\overline{\alpha}_t}\, y_0 + \sqrt{1 - \overline{\alpha}_t}\, \epsilon_t$ 4:  Compute $\Delta\epsilon_{t,\theta} = \epsilon_t - \text{StopGradient}(\epsilon_\theta(x_0, y_t, t))$ 5:  Compute $\hat{y}_t = y_t + \sqrt{1 - \overline{\alpha}_t}\, \lambda_t \Delta\epsilon_{t,\theta}$ 6:  Update $\theta$ with gradient $\nabla_\theta \|\epsilon_t + \lambda_t \Delta\epsilon_{t,\theta} - \epsilon_\theta(x_0, \hat{y}_t, t)\|_1$
7: until converged

---

The SR Model training component 260 uses the diffusion data 230 or the adaption data 270 to train the SR model 240. During training a pure noise image 252 and an LR image 213 are provided as a starting input. The model outputs a prediction 254. The prediction is compared to the iteration specific diffusion data 230 or the adaption data 270 using a loss function. The SR model 240 is trained to minimize loss at teach iteration across the Markov chain. The training may occur with a plurality of image pairs.

While the same SR model Ee may be utilized for calculating both the rectification term $\Delta\epsilon_{t,\theta}$ and the predicted noise $\epsilon_\theta(x_0, \hat{y}_t, t)$ in Eq. (9), a key distinction exists: the DREAM technology refrains from propagating the gradient (e.g., training) when computing $\Delta\epsilon_{t,\theta}$, and thus, it is derived from the frozen network. The actual supervision is imposed following its adaptive adjustment. Moreover, it may be observed that using the same Gaussian noise (i.e., $\epsilon_t \equiv \epsilon_t'$)

in DREAM yields superior performance, further simplifying Eq. (13) to:

$$\hat{y}_t = y_t^{train} + \sqrt{1 - \overline{\alpha}_t}\, \lambda_t \Delta\epsilon_{t,\theta}. \qquad (8)$$

Turning now to FIG. 3, the operation of a trained SR model 340 is illustrated. The trained SR model 340 receives a LR image 310 and generic noise matrix (not shown). The generic noise matrix may have the same dimensions as the desired HR image 320. The LR image 310 may have a different dimension. The trained SR model 340 iteratively removes noise from the generic noise matrix, guided by the LR image 310, to produce the HR image 320. The HR image 320 will be a higher resolution version of the LR image 310. Example Methods Now referring to FIGS. 4, 5 and 6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 400, 500, and 600 are described, by way of example, with respect to FIGS. 1-3. However, these methods may additionally or alternatively be executed by any one system, or any combination of systems, including, but not limited to, those described herein.

FIG. 4 is a flow diagram showing a method 400 of training an SR model, in accordance with some embodiments of the present disclosure. Method 400 may be performed on or with systems similar to those described with reference to FIGS. 1-2.

At step 410, the method 400 includes receiving, by the computing device, training data comprising a high-resolution image and a corresponding low-resolution image.

At step 420, the method 400 includes generating, by the computing device, an estimated high-resolution image of the high-resolution image that includes a difference from the high-resolution image. In one aspect, the estimated high-resolution image is generated by performing a single additional forward pass without training, which allows the SR model to use its own predictions. A pre-trained SR model may be the starting point for the DREAM training, which allows the SR model to make an initial prediction. As used herein, to is a starting point, $t_1$ represents data after the first forward step and $t_n$ after the last forward step. In order to create the estimated HR, the HR image at $t_0$ may be provided the SR model training system, which adds a noise mask at $t_1$ to the HR image at $t_0$ to create a noisy image at $t_1$. The pre-trained SR model then generates an estimated noise mask at $t_1$. Under traditional methods, the SR model would then be trained to reduce the difference between the noise mask at $t_1$ and the estimated noise mask at $t_1$. Under the DREAM training, no training occurs during this first pass. Instead, the estimated HR image is generated by removing the noise from the noisy image at $t_1$ according to the estimated noise mask at $t_1$. The difference between the noise mask at $t_1$ and the estimated noise mask at $t_1$ will be reflected in the estimated HR image. This difference represents the SR model's current estimation error.

At step 430, the method 400 includes training a neural network to generate a high-resolution output image from a low-resolution input image, wherein the training comprises applying a forward diffusion process to the estimated high-resolution image that iteratively adds noise to the estimated high-resolution image and an iterative denoising process that is based on a reverse Markov chain associated with the forward diffusion process. In aspects, the neural network may be a convolutional neural network conforming to a U-Net architecture. For example, the U-Net architecture deployed may be set up according to SR3 model. The training of the neural network has been described previously.

At step 440, the method 400 includes outputting the trained neural network. Once trained, the neural network is able to generate a high-resolution version of a low-resolution version provided as input.

FIG. 5 is a flow diagram showing a method 500 of training an SR model, in accordance with some embodiments of the present disclosure. Method 500 may be performed on or with systems similar to those described with reference to FIGS. 1-2.

At step 510, the method 500 includes receiving, by the computing device, training data comprising a high-resolution image and a corresponding low-resolution image.

At step 520, the method 500 includes generating, by the computing device, an estimated high-resolution image of the high-resolution image that includes a difference from the high-resolution image. In one aspect, the estimated high-resolution image is generated by performing a single additional forward pass without training, which allows the SR model to use its own predictions. A pre-trained SR model may be the starting point for the DREAM training, which allows the SR model to make an initial prediction. As used herein, to is a starting point, $t_1$ represents data after the first forward step and $t_n$ after the last forward step. In order to create the estimated HR, the HR image at $t_0$ may be provided the SR model training system, which adds a noise mask at $t_1$ to the HR image at $t_0$ to create a noisy image at $t_1$. The pre-trained SR model then generates an estimated noise mask at $t_1$. Under traditional methods, the SR model would then be trained to reduce the difference between the noise mask at $t_1$ and the estimated noise mask at $t_1$. Under the DREAM training, no training occurs during this first pass. Instead, the estimated HR image is generated by removing the noise from the noisy image at $t_1$ according to the estimated noise mask at $t_1$. The difference between the noise mask at $t_1$ and the estimated noise mask at $t_1$ will be reflected in the estimated HR image. This difference represents the SR model's current estimation error.

At step 530, the method 500 includes training a neural network to generate a high-resolution output image from a low-resolution input image. The training comprises applying a forward diffusion process to the estimated high-resolution image that iteratively adds noise to the estimated high-resolution image. The training further comprises performing an adjustment to the estimated high-resolution image that reduces the difference between the high-resolution image and the estimated high-resolution image. The training further comprises an iterative denoising process that is based on a reverse Markov chain associated with the forward diffusion process. In aspects, the neural network may be a convolutional neural network conforming to a U-Net architecture. For example, the U-Net architecture deployed may be set up according to SR3 model. The training of the neural network has been described previously.

At step 540, the method 500 includes outputting the trained neural network. Once trained, the neural network is able to generate a high-resolution version of a low-resolution version provided as input.

FIG. 6 is a flow diagram showing a method 600 of training an SR model, in accordance with some embodiments of the present disclosure. Method 600 may be performed on or with systems similar to those described with reference to FIGS. 1-2.

At step 610, the method 600 includes receiving, by the computing device, training data comprising a high-resolution image and a corresponding low-resolution image.

At step 620, the method 600 includes generating, by the computing device, an estimated high-resolution image of the high-resolution image that includes a difference from the high-resolution image. In one aspect, the estimated high-resolution image is generated by performing a single additional forward pass without training, which allows the SR model to use its own predictions. A pre-trained SR model may be the starting point for the DREAM training, which allows the SR model to make an initial prediction. As used herein, to is a starting point, $t_1$ represents data after the first forward step and $t_n$ after the last forward step. In order to create the estimated HR, the HR image at $t_0$ may be provided the SR model training system, which adds a noise mask at $t_1$ to the HR image at $t_0$ to create a noisy image at $t_1$. The pre-trained SR model then generates an estimated noise mask at $t_1$. Under traditional methods, the SR model would then be trained to reduce the difference between the noise mask at $t_1$ and the estimated noise mask at $t_1$. Under the DREAM training, no training occurs during this first pass. Instead, the estimated HR image is generated by removing the noise from the noisy image at $t_1$ according to the estimated noise mask at $t_1$. The difference between the noise mask at $t_1$ and the estimated noise mask at $t_1$ will be reflected in the estimated HR image. This difference represents the SR model's current estimation error.

At step 630, the method 600 includes training a neural network to generate a high-resolution output image from a low-resolution input image. The training comprises applying a forward diffusion process to the estimated high-resolution image that iteratively adds noise to the estimated high-resolution image. The training further comprises an iterative denoising process that is based on a reverse Markov chain associated with the forward diffusion process. The low-resolution image is provided to the neural network as training data during the iterative denoising process. In aspects, the neural network may be a convolutional neural network conforming to a U-Net architecture. For example, the U-Net architecture deployed may be set up according to SR3 model. The training of the neural network has been described previously.

At step 640, the method 600 includes outputting the trained neural network. Once trained, the neural network is able to generate a high-resolution version of a low-resolution version provided as input.

Example Operating Environment

Figure 7:
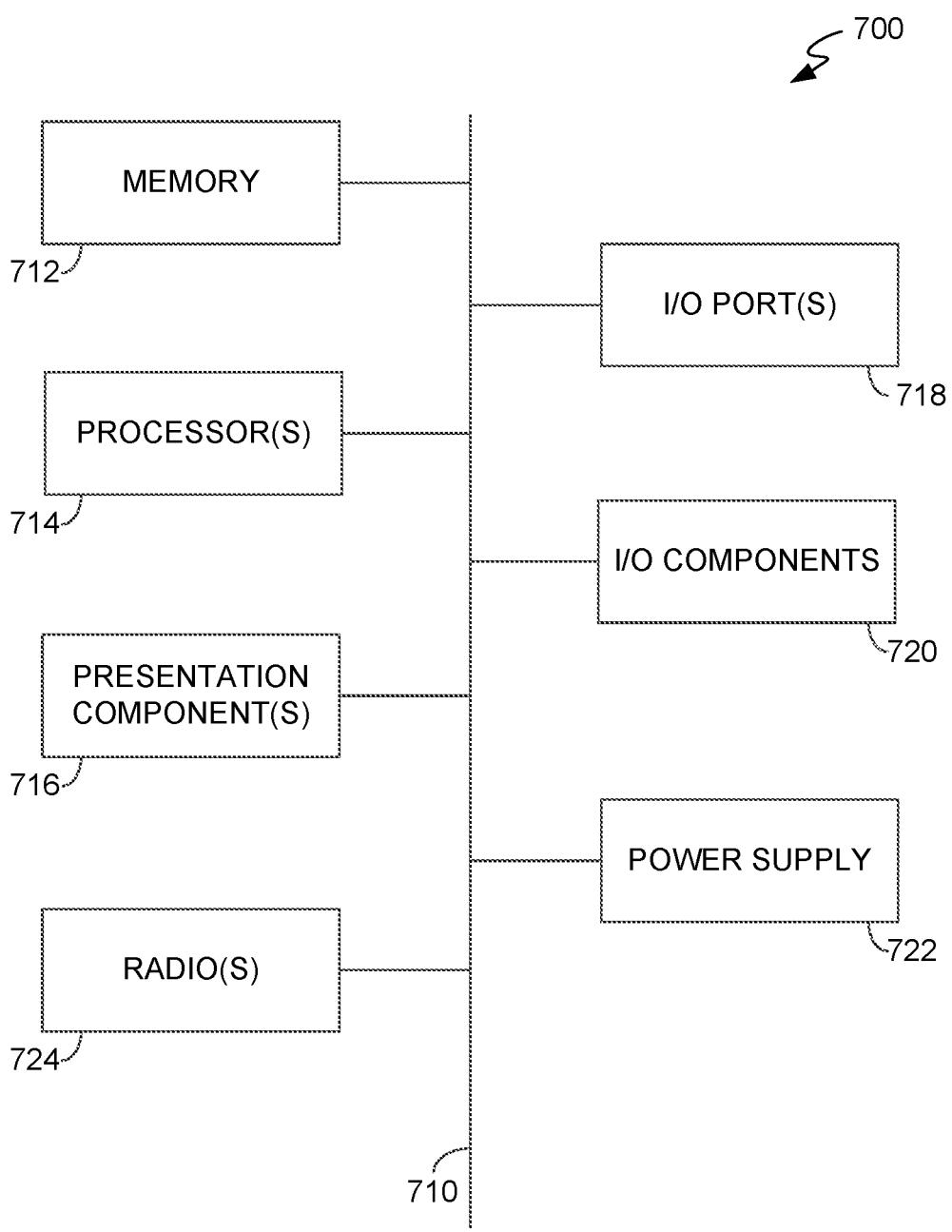
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input.

The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by computing device performs a method of training a diffusion model, the method comprising:

receiving, by the computing device, training data comprising a high-resolution image and a corresponding low-resolution image;

generating, by the computing device, an estimated high-resolution image of the high-resolution image that includes a difference from the high-resolution image;

training a neural network to generate a high-resolution output image from a low-resolution input image, wherein the training comprises applying a forward diffusion process to the estimated high-resolution image that iteratively adds noise to the estimated high-resolution image and an iterative denoising process that is based on a reverse Markov chain associated with the forward diffusion process; and outputting the trained neural network.

2. The media of claim 1, wherein the low-resolution image is provided to the neural network as training data during the iterative denoising process.

3. The media of claim 1, wherein the training further comprises performing a per-iteration adjustment to the estimated high-resolution image that reduces the difference between the high-resolution image and the estimated high-resolution image.

4. The media of claim 3, wherein the per-iteration adjustment reduces more of the difference toward a start of a Markov chain and less of the difference toward an end of the Markov chain, wherein the start of the Markov chain corresponds to the estimated high-resolution image without noise added.

5. The media of claim 1, wherein the neural network is trained to accurately predict a noise mask added at an iteration.

6. The media of claim 1, wherein the estimated high-resolution image is generated by:

adding a noise mask to the high-resolution image to form a first noisy image;

using the neural network to generate a noise mask prediction based on the first noisy image; and using the noise mask prediction to remove noise from the first noisy image to produce the estimated high-resolution image.

7. The media of claim 1, wherein the high-resolution image is not directly used in training except to generate the estimated high-resolution image.

8. A method of training a diffusion model, the method comprising:

receiving, by the computing device, training data comprising a high-resolution image and a corresponding low-resolution image;

generating, by the computing device, an estimated high-resolution image of the high-resolution image that includes a difference from the high-resolution image;

training a neural network to generate a high-resolution output image from a low-resolution input image, wherein the training comprises applying a forward diffusion process to the estimated high-resolution image that iteratively adds noise to the estimated high-resolution image, wherein the training further comprises performing an adjustment to the estimated high-resolution image that reduces the difference between the high-resolution image and the estimated high-resolution image, and wherein the training further comprises an iterative denoising process that is based on a reverse Markov chain associated with the forward diffusion process; and outputting the trained neural network.

9. The method of claim 8, wherein the estimated high-resolution image is generated by:

adding a noise mask to the high-resolution image to form a first noisy image;

using the neural network to generate a noise mask prediction based on the first noisy image; and using the noise mask prediction to remove noise from the first noisy image to produce the estimated high-resolution image.

10. The method of claim 8, wherein the adjustment is a per-iteration adjustment that varies on a per-iteration basis.

11. The method of claim 10, wherein the per-iteration adjustment reduces more of the difference toward a start of a Markov chain and less of the difference toward an end of the Markov chain, wherein the start of the Markov chain corresponds to the estimated high-resolution image without noise added.

12. The method of claim 8, wherein the low-resolution image is provided to the neural network as training data during the iterative denoising process.

13. The method of claim 8, wherein the high-resolution image is not directly used in training except to generate the estimated high-resolution image.

14. The method of claim 8, wherein the neural network is trained to accurately predict a noise mask added at an iteration.

15. A method of training a diffusion model, comprising:

receiving, by the computing device, training data comprising a high-resolution image and a corresponding low-resolution image;

generating, by the computing device, an estimated high-resolution image of the high-resolution image that includes a difference from the high-resolution image;

training a neural network to generate a high-resolution output image from a low-resolution input image, wherein the training comprises applying a forward diffusion process to the estimated high-resolution image that iteratively adds noise to the estimated high-resolution image, wherein the training further comprises an iterative denoising process that is based on a reverse Markov chain associated with the forward diffusion process, wherein the low-resolution image is provided to the neural network as training data during the iterative denoising process; and outputting the trained neural network.

16. The method of claim 15, wherein the training further comprises performing a per-iteration adjustment to the estimated high-resolution image that reduces the difference between the high-resolution image and the estimated high-resolution image.

17. The method of claim 16, wherein the per-iteration adjustment reduces more of the difference toward a start of a Markov chain and less of the difference toward an end of the Markov chain, wherein the start of the Markov chain corresponds to the estimated high-resolution image without noise added.

18. The method of claim 15, wherein the estimated high-resolution image is generated by:

adding a noise mask to the high-resolution image to form a first noisy image;

using the neural network to generate a noise mask prediction based on the first noisy image; and using the noise mask prediction to remove noise from the first noisy image to produce the estimated high-resolution image.

19. The method of claim 15, wherein the neural network is trained to accurately predict a noise mask added at an iteration.

20. The method of claim 15, wherein the high-resolution image is not directly used in training except to generate the estimated high-resolution image.

\* \* \* \* \*